United States Patent
Hatamura

(10) Patent No.: US 6,314,173 B1
(45) Date of Patent: Nov. 6, 2001

(54) TELEPHONE APPARATUS HAVING A MULTIFUNCTION CALL-WAITING OPERATING PORTION

(75) Inventor: Junji Hatamura, Nagoya (JP)

(73) Assignee: Brother, Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/086,945

(22) Filed: May 29, 1998

(30) Foreign Application Priority Data

Jun. 4, 1997 (JP) .................................................. 9-146843

(51) Int. Cl.$^7$ ........................... H04M 3/20; H04M 3/424; H04M 3/58; H04M 1/27
(52) U.S. Cl. .............................. 379/215.01; 379/355.01; 379/355.09
(58) Field of Search .................................... 379/215, 216, 379/355, 356, 215.01, 216.01, 355.01, 355.02, 355.03, 355.04, 355.05, 355.06, 355.07, 355.08, 355.09, 355.1, 356.01; 455/414

(56) References Cited

U.S. PATENT DOCUMENTS 3,963,874 * 6/1976 Pommerening et al. ............ 379/215

FOREIGN PATENT DOCUMENTS 7-321888  12/1995  (JP) ................................ H04M/1/00

\* cited by examiner

*Primary Examiner*—Harry S. Hong
(74) *Attorney, Agent, or Firm*—Oliff & Berridge PLC

(57) ABSTRACT

A telephone apparatus is disclosed wherein the use of the call-waiting service is provided while a dedicated call-waiting operating portion is not required. When there is a call from a third party's telephone apparatus to a first party while the first party is conducting a telephone conversation with a second party, a call-waiting unit switches the first party's line connection from the second party's telephone apparatus to the third party's telephone apparatus. A call-waiting operating portion or button is used to instruct the call-waiting unit to switch the line connection. The call-waiting operating portion is structured so that the operating portion can also be used as an operating portion that has a function other than the call-waiting function. When the call-waiting button is depressed, a CPU determines whether the line is connected and then whether the telephone apparatus is in a dialing or communication mode. Only in a case where the apparatus is in a dialing or communication mode, does the call-waiting button function. In the other cases, the CPU causes the call-waiting button to function as a function button that is normally not used during telephone conversation. For example, the call-waiting button may function as an abbreviated-dialing button, thereby reducing the number of required buttons or component parts, and thus, reduce production costs.

28 Claims, 3 Drawing Sheets

TELEPHONE APPARATUS HAVING A MULTIFUNCTION CALL-WAITING OPERATING PORTION

BACKGROUND OF THE INVENTION

1. Field of Invention

The invention relates to a telephone apparatus and, more particularly, to a telephone apparatus that allows the use of a so-called call-waiting service, whereby when a third party attempts to call a first party while the first party is conducting a telephone conversation with a second party, the first party's telephone line connection can be switched between the second party's telephone apparatus and the to the third party's telephone apparatus.

2. Description of Related Art

Many conventional telephones have a catch-phone (or hereinafter, referred to call-waiting) device that, if there is a call from a third party to a first party while the first party is conducting a conversation with a second party, the first party receives a "beep" from the exchange carrier. The first party may then signal the exchange carrier to switch the first party's telephone line connection from the second party to the third party. The first party may then switch back to the second party by using the same call-waiting device to switch the line connection. Therefore, this type of telephone apparatus can substantially eliminate incidents where a caller is kept waiting due to a continual busy state of a called party's telephone.

However, this type of telephone needs to have a call-waiting operating portion (i.e., buttons, mechanisms, etc.) in addition to the conventional operating portions, thereby increasing the number of component parts, as well as the production costs of the telephone. In late-model telephones, the structure of the operating portion of the telephone have become rather complicated due to the adoption of additional dial buttons, such as "*", "#" and the like, and additional function buttons for, for example, abbreviated dialing (or speed dialing) whereby a telephone number pre-stored in a memory device, such as a non-volatile memory, is read out of memory and dialed. Therefore, a dedicated call-waiting operating portion may give rise to problems in installation space or external design.

In addition, Japanese Unexamined Patent Publication No. 07-32188 discloses a telephone that has a function whereby a first party operates a button that interrupts a call between a first party and a second party and simultaneously sends an "imitation holding sound" to the second party. However, the telephone only sends an "imitation holding sound" to the second party and does not perform a call-waiting-type function.

SUMMARY OF THE INVENTION

Accordingly, it is an object of the invention to provide a telephone apparatus that allows the use of a call-waiting service without employing a dedicated call-waiting operating portion.

According to the invention, there is provided a telephone apparatus including a call-waiting unit that, when there is a call from a third party during a first party's telephone communication with a second party, switches the first party's telephone line connection from the second party's telephone to the third party's telephone. The telephone includes a call-waiting operating portion operable to instruct the call waiting unit to switch the line connection. The call-waiting operating portion is structured so that the call-waiting operating portion has a function other than a function of the call-waiting operating portion.

In the telephone apparatus of the invention, the call-waiting operating portion that instructs the call-waiting unit to switch the line connection is structured so as to also function as a predetermined operating portion having a different function. Therefore, the telephone apparatus allows the call-waiting service to be used although an operating portion dedicated to the call-waiting function is not provided. Consequently, the telephone apparatus of the invention achieves the call-waiting function and, at the same time, reduces the number of the component parts required for the operating portions and the related production costs. Furthermore, since there is no need to separately provide an operating portion dedicated to the call-waiting function, the telephone apparatus of the invention does not give rise to problems in installation space or external design. Consequently, the cost of developing a new telephone model can be minimized.

The telephone apparatus of the invention may further include a determining unit and a function switching unit. In this embodiment, the determining unit determines whether the telephone apparatus is connected to another telephone apparatus. Based on the determination by the determining unit, the function switching unit switches the call-waiting operating portion between the two different functions thereof in the following manner. For example, when it is determined that the telephone line of the telephone apparatus is not connected, the function switching unit causes the call-waiting operating portion to function as the predetermined operating portion having a different function. When it is determined that the line is connected, the function switching unit causes the call-waiting operating portion to function as the call-waiting operating portion. Since the call-waiting unit switches the line connection only when the telephone apparatus is connected to another telephone apparatus, the function switching unit switches the call-waiting operating portion between the different functions thereof in accordance with the determination as to whether the telephone line is connected.

With this structure, the telephone apparatus causes the call-waiting operating portion to function as the call-waiting operating portion only in a case where the call-waiting unit is effective and, in the other cases, causes the call-waiting operating portion to function as the predetermined operating portion having a different function. Therefore, the telephone apparatus with this structure does not cause a substantial inconvenience while using the call-waiting operating portion for the call-waiting function and a different function.

The telephone apparatus of the invention may further include a storage unit that stores a telephone number, and a memory calling unit that reads the telephone number from the storage unit and calls the telephone number. In this embodiment, the predetermined operating portion is an operating portion that is operable to instruct the memory calling unit to make a call.

With this structure, the memory calling unit reads a telephone number from the storage unit and calls the number, upon operation of the call-waiting operating portion when the call-waiting operating portion has been switched to the function of the predetermined operating portion. Therefore, it becomes possible to call a telephone apparatus very easily without mis-dialing. Since the memory calling unit is normally not used when the telephone apparatus is connected to a telephone apparatus by a telephone line, there is no substantial problem if the call-waiting operating portion functions only as the call-waiting operating portion when the line is connected. Thus, the telephone apparatus with this structure makes it possible to call a telephone apparatus very easily without mis-dialing and substantially eliminates the inconvenience that may be caused by the use of the call-waiting operating portion for the two different functions.

BRIEF DESCRIPTION OF THE DRAWINGS

A preferred embodiment of the invention will be described in detail with reference to the following figures wherein.

DETAILED DESCRIPTION OF PREFERRED EMBODIMENTS

Figure 1:
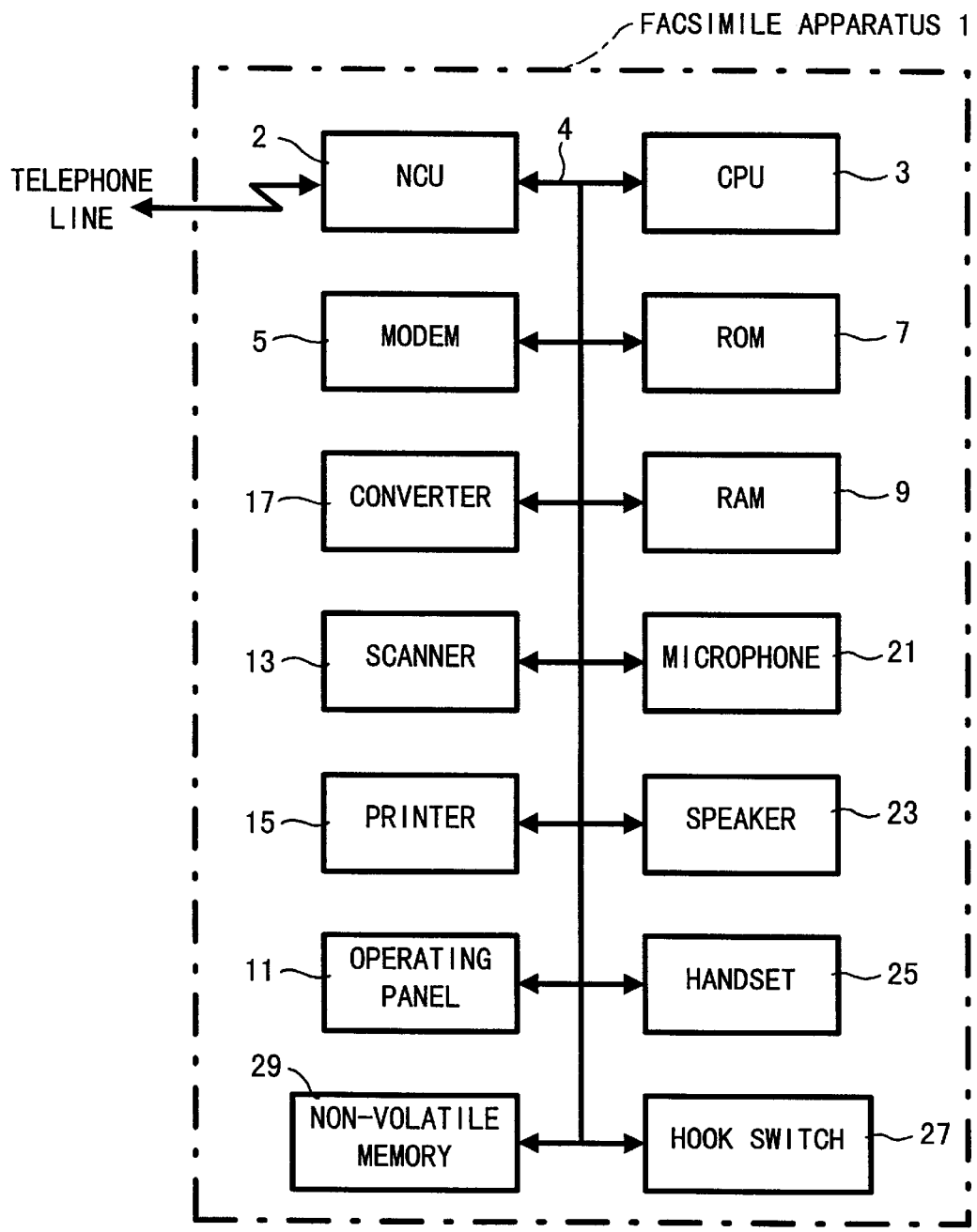
FIG. 1 is a schematic block diagram of the construction of a facsimile apparatus according to a preferred embodiment of the invention.

A preferred embodiment of the present invention will be described in detail hereinafter with reference to the accompanying drawings. FIG. 1 is a schematic block diagram of the facsimile apparatus 1 to which the invention is applied. The facsimile apparatus 1 of this preferred embodiment serves also as a telephone apparatus, as described below.

Referring to FIG. 1, the facsimile apparatus 1 is connected to a telephone line by a network control unit (NCU) 2 that performs line control. A CPU 3, functioning as a central component of the facsimile apparatus 1, is connected to various devices, such as the NCU 2, by bus lines 4. The CPU 3 performs facsimile operations and other data communication, in accordance with a predetermined communication control procedure.

A modem 5 modulates and demodulates fax data, and transmits and receives various procedure signals for transmission control. A ROM 7 is a memory for storing various control programs in a non-rewritable manner. A RAM 9 is a memory for temporarily storing various data during execution of a control function. An operating panel 11 has a display for displaying an operating status of the facsimile apparatus 1, and various buttons, as described below. A scanner 13 optically reads an image on a document to be transmitted. The scanner 13 consists of, for example, a light emitting portion that emits a laser beam to a document in a sweeping manner, and a light receiving portion that receives reflection light from the document and prepares a bit image of the document image.

A printer 15 records an image corresponding to the received facsimile data using, for example, an electrostatic electrophotographic recording method in which a latent image is formed on a photosensitive member by a laser beam, developed with toner, and transferred onto a recording sheet. A converter 17 converts data read by the scanner 13, such as bit image data, into transmission facsimile data by encoding the data. The converter 17 also converts received facsimile data into image data for printing by decoding the facsimile data. The converter 17 may be formed by, for example, an encoding or decoding circuit that is used both for encoding and decoding.

The bus lines 4 are further connected to various devices, such as a microphone 21 that functions as a telephone transmitter when a speaker button 33 is depressed, a speaker 23 that produces calling tones, and the like, and functions as a telephone receiver when the speaker button 33 is depressed, a handset 25 having a built-in microphone and a built-in speaker (not shown), a hook switch 27 that detects placement of the handset 25, and a non-volatile memory 29 that stores frequently-used telephone numbers as abbreviated dialing numbers. The non-volatile memory 29 stores telephone numbers as two-digit number codes (one-digit or three-digit number codes are also possible), and retains the storage content even during power-down, such as a blackout. The method for registering an abbreviated dialing number into the non-volatile memory 29 is a well-known method and will not be described herein.

Figure 2:
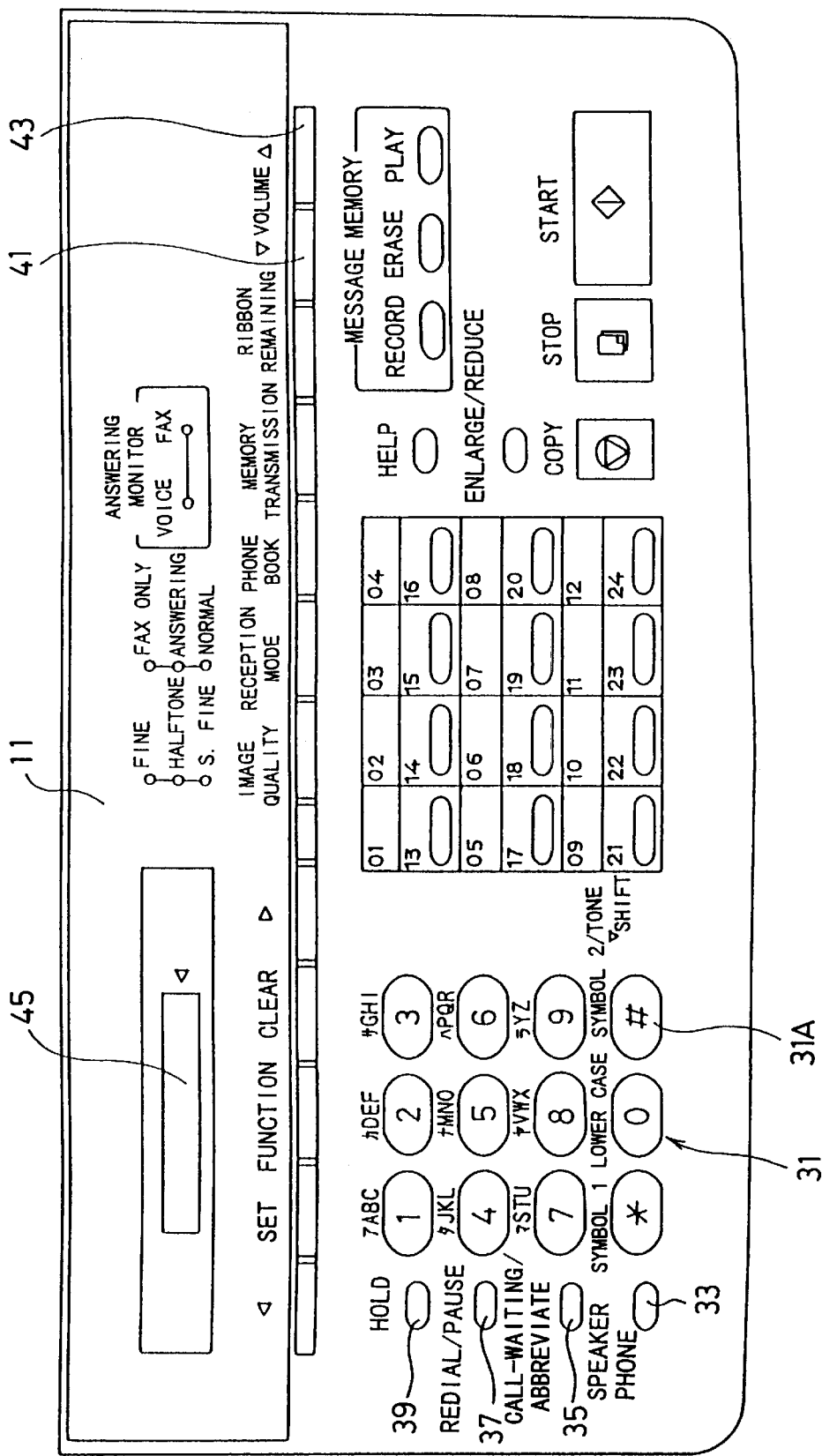
FIG. 2 is a plan view of an operating panel of the facsimile apparatus illustrated in FIG. 1.

The structure of the operating panel 11 will next be described with reference to FIG. 2. The operating panel 11 carries thereon dial buttons 31 for dialing a desired telephone number and inputting characters for caller data or the like, the speaker button 33 for performing dialing operations or conducting conversations without picking up the handset 25, a call-waiting/abbreviated button 35 for both switching a call between a second and a third party, and for using a pre-stored abbreviated dialing number, a redial/pause button 37 for redialing the last dialed number and for placing a pause during the input of a telephone number, a hold button 39 for placing a party on hold, volume switch buttons 41, 43 for increasing and decreasing the sound volume of calling tones or voices, and other buttons. The operating panel 11 also has a display 45 for displaying various messages. Among the dial buttons 31, a button 31a corresponding to a symbol "#" also serves as a tone button that is to be depressed to enable the use of a touch-tone telephone service through a pulse signaling line.

The CPU 3 is connected to the NCU 2, the modem 5, the ROM 7, the RAM 9, the operating panel 11, the scanner 13, the printer 15, the converter 17, the microphone 21, the speaker 23, the handset 25, the hook switch 27 and the non-volatile memory 29, as described above. By inputting signals from and outputting signals to, the various devices, the CPU 3 performs facsimile transmission and receiving operations, copying operations, and various operations regarding telephone calls. These operations are well known (described in, for example, Japanese Patent Application No. Hei 9-94096) and will not be described in detail herein.

The operations executed by the CPU 3 in relation to the operation of the call-waiting/abbreviated button 35 will be described with reference to the flowchart of FIG. 3. The CPU 3 repeatedly executes these operations for a predetermined length of time.

Figure 3:
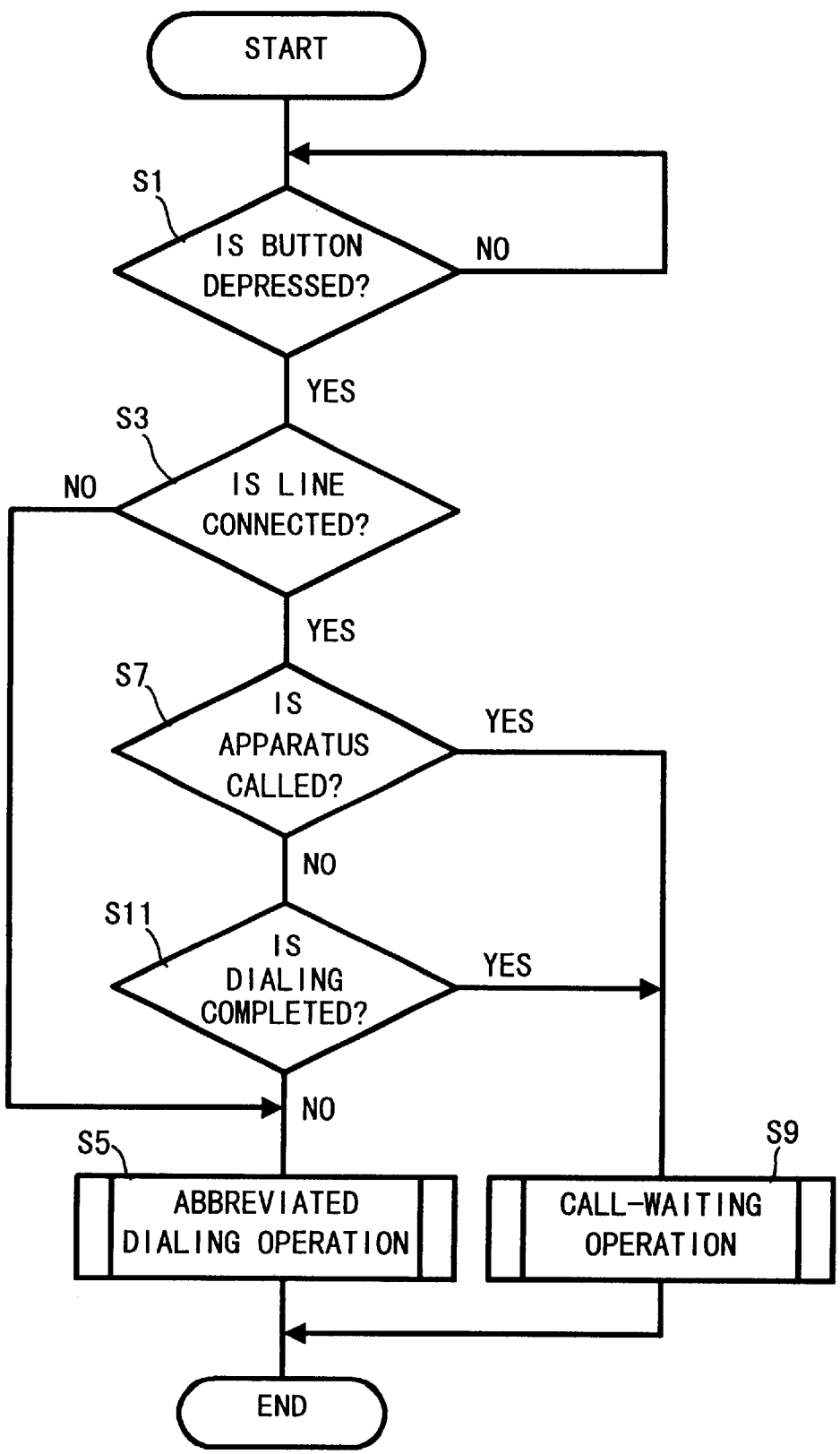
FIG. 3 is a flowchart illustrating an example of the operations performed by the facsimile apparatus.

Referring to the flowchart of FIG. 3, when the operation begins, the CPU 3 determines in step S1 whether the call-waiting/abbreviated button 35 has been depressed. If the call-waiting/abbreviated button 35 has not been depressed (NO in step S1), the CPU 3 waits in step S1 while performing other operations (not illustrated).

When the call-waiting/abbreviated button 35 is depressed (YES in step S1), the CPU 3 proceeds to step S3, where the CPU 3 determines whether the telephone line is connected. In step S3, the CPU 3 determines that the line is connected, if the handset 25 has been picked up or if the speaker button 33 has been depressed. (YES in step S3). This situation includes a state where although the line is not connected to another telephone, it is connected to an exchange so that a connection tone (or dial tone) is produced.

If the line is not connected (NO in step S3), the operation proceeds to step S5, where an abbreviated dialing operation is performed. In the operation of step S5, the CPU 3 reads from the non-volatile memory 29 a telephone number corresponding to a two-digit code input by the user, and calls the number using the NCU 2. That is, in this case, the call-waiting/abbreviated button 35 functions as an operating portion for using the abbreviated dialing function. Through the operation of step S5, a user can call a desired telephone number very easily without mis-dialing. If the CPU 3 proceeds to the abbreviated dialing operation without the handset 25 being picked up or the speaker button 33 being depressed, the CPU 3 causes the speaker 23 and the like to function as in a case where the speaker button 33 is depressed. After step S5, the CPU 3 temporarily ends the operation illustrated in FIG. 3.

If the line is connected (YES in step S3), the operation proceeds to step S7, where the CPU 3 determines whether the facsimile apparatus 1 has been called. If the facsimile apparatus 1 has been called, the facsimile apparatus 1 is connected to the caller's telephone line simultaneously with the connection of the line of the facsimile apparatus 1 (YES in step S3). That is, the affirmative determination in step S7 means that the facsimile apparatus 1 is already in communication or conversation with another telephone apparatus. In this case, the CPU 3 proceeds to step S9, where a call-waiting operation is executed. After step S9, the CPU 3 temporarily ends the operation illustrated by the flowchart of FIG. 3.

In the operation of FIG. 3, if there is a call to a first party from a third party's telephone apparatus, the CPU 3 switches the first party's telephone line connection from the second party's telephone apparatus that is presently connected, to the line connection of the third party's telephone apparatus. The CPU 3 places the second party's telephone apparatus on hold and sends a melody or message, for example, to the second party's telephone apparatus. In this case, therefore, the call-waiting/abbreviated button 35 functions as a call-waiting operating portion for a call-waiting function.

If it has been determined that the line is connected (YES in step S3) and that the facsimile apparatus 1 is dialing out (NO in step S7), the operation proceeds to step S11, where it is determined whether dialing is completed. If dialing has been completed (YES in step S11), the facsimile apparatus 1 is pressured to be in communication with a telephone apparatus, so that the CPU 3 proceeds to step S9. After executing the call-waiting operation in step S9, the CPU 3 ends the operation illustrated in FIG. 3.

If it is determined in step S11 that dialing is not completed (NO in step S11), i.e., that the dialing of a telephone number is about to start or in progress after the handset 25 has been picked up or after the speaker button 33 has been depressed, the CPU 3 proceeds to step S5. After executing the abbreviated dialing operation of step S5, the CPU 3 temporarily ends the operation of FIG. 3.

As is apparent from the foregoing description, in the facsimile apparatus 1, the operating portion for using the call-waiting function is also used as an operating portion for using the abbreviated dialing function, that is, the two operating portions form or share the call-waiting/abbreviated button 35. Thus, the facsimile apparatus 1 allows a user to use the call-waiting service although the operating portion dedicated to the call-waiting function is not provided. Therefore, this embodiment reduces the number of component parts needed to construct the operating panel 11 and reduces the production costs. Furthermore, since there is no need to provide a dedicated operating portion for the call-waiting function, the embodiment does not give rise to problems concerning installation space or external design of the telephone apparatus. Consequently, the cost of developing a new model can be minimized.

In the facsimile apparatus 1, only in a case where the facsimile apparatus 1 is calling a telephone apparatus or in communication with a telephone apparatus after the line has been connected to that telephone apparatus (YES in step S7 or YES in step S11), does the call-waiting/abbreviated button 35 function as the call-waiting operating portion. That is, only when the call-waiting operation of step S9 is effective, does the facsimile apparatus 1 causes the call-waiting/abbreviated button 35 to operate for the call-waiting operating portion. In addition, since the abbreviated dialing function is normally not used when the line of the facsimile apparatus 1 is connected to a telephone apparatus, there is no substantial problem if the call-waiting/abbreviated button 35 cannot be used as the operating portion for the abbreviated dialing function when the line is connected. Therefore, the facsimile apparatus 1 substantially eliminates the inconvenience that may be caused by the use of the call-waiting/abbreviated button 35 for the two different functions.

In this embodiment, in the operation of step S9, the CPU 3 and the storage area in the ROM 7 for storing the corresponding programs and the like, form a call-waiting unit. In the operations of steps S3, S7 and S11, the CPU 3 and the storage area in the ROM 7, form a determining unit and a function switching unit. The non-volatile memory 29 forms a storage unit. In the operation of step S5, the CPU 3 and the storage area in the ROM 7 for storing the corresponding programs and the like, and form a memory calling unit.

While the invention has been described with reference the preferred embodiment, the invention is not restricted by the particular forms shown in the foregoing embodiment. On the contrary, the invention can be carried out in various other forms without departing from the scope of the invention. For example, although in the foregoing embodiment, the operating portion for the abbreviated dialing function is used also as the call-waiting operating portion, any other operating portion that is normally not used during telephone conversation or communication may be designed to function also as the call-waiting operating portion. For example, the redial/pause button 37 may be designed to function also as the call-waiting operating portion during telephone communication.

Such a structure according to the invention, also reduces the number of required component parts without causing any substantial inconvenience. Furthermore, the determination regarding the switching between the functions of the call-waiting operating portion may be performed in a manner other than the manner described above. In addition, it is also possible to apply the invention to various telephone apparatuses that do not function as a facsimile apparatus.

What is claimed is:

1. A telephone apparatus for use by a first party, comprising:

a call-waiting unit that switches the first party's telephone connection between a second party's telephone and a third party's telephone, when the third party attempts to call the first party while the first party is connected to the second party in a call; and a call-waiting operating portion that instructs the call-waiting unit to switch the first party's telephone connection between the second party's telephone and the third party's telephone, the call-waiting operating portion also operating as a predetermined operating portion having a function different than the call-waiting operation portion only when the telephone apparatus is not connected to another telephone apparatus.

2. The telephone apparatus according to claim 1, further comprising:
   a determining unit that determines whether the telephone apparatus is connected to another telephone apparatus.

3. The telephone apparatus according to claim 2, further comprising:
   a function switching unit that causes the call-waiting operating portion to function as the predetermined operating portion that has a function other than a function of the call-waiting operating portion, when the determining unit determines that the telephone apparatus is not connected to another telephone apparatus, and that causes the call-waiting operating portion to operate as the call-waiting operating portion when the determining unit determines that the telephone apparatus is connected to another telephone apparatus.

4. The telephone apparatus according to claim 3, wherein the determining unit determines whether the telephone apparatus is connected to another telephone apparatus by determining one of whether the telephone apparatus's handset is off-hook and the telephone apparatus has received a call, and whether the telephone apparatus's handset is off-hook and dialing of a telephone number has been completed.

5. The telephone apparatus according to claim 3, wherein the determining unit determines whether the telephone apparatus is connected to another telephone apparatus by determining one of whether a speaker function has been operated and the telephone apparatus has received a call, and whether the speaker function has been operated and dialing of a telephone number has been completed.

6. The telephone apparatus according to claim 1, wherein the predetermined operating portion is a portion for performing an abbreviated dialing function.

7. The telephone apparatus according to claim 6, further comprising:
   a storage unit that stores a telephone number; and
   a memory calling unit that reads the telephone number from the storage unit and calls the telephone number,
   wherein the predetermined operating portion instructs the memory calling unit to make a call.

8. The telephone apparatus according to claim 1, wherein the predetermined operating portion is a portion for performing a redial function.

9. The telephone apparatus according to claim 8, further comprising:
   a storage unit that stores a telephone number previously dialed; and
   a memory calling unit that reads the telephone number from the storage unit and calls the telephone number,
   wherein the predetermined operating portion instructs the memory calling unit to make a call.

10. A telephone apparatus for use by a first party, comprising:
    call-waiting means for switching the first party's telephone connection between a second party's telephone and a third party's telephone, when the third party attempts to call the first party while the first party is connected to the second party in a call; and
    call-waiting operating means for instructing the call-waiting means to switch the first party's telephone connection between the second party's telephone and the third party's telephone, the call-waiting operating means also operating as a predetermined operating means having a function different than the call-waiting operating means only when the telephone apparatus is not connected to another telephone apparatus.

11. The telephone apparatus according to claim 10, further comprising:
    determining means for determining whether the telephone apparatus is connected to another telephone apparatus.

12. The telephone apparatus according to claim 11, further comprising:
    function switching means for causing the call-waiting operating means to function as the predetermined operating means that has a function other than a function of the call-waiting operating means, when the determining means determines that the telephone apparatus is not connected to another telephone apparatus, and for causing the call-waiting operating means to operate as the call-waiting operating means when the determining means determines that the telephone apparatus is connected to another telephone apparatus.

13. The telephone apparatus according to claim 12, wherein the determining means determines whether the telephone apparatus is connected to another telephone apparatus by determining one of whether the telephone apparatus's handset is off-hook and the telephone apparatus has received a call, and whether the telephone apparatus's handset is off-hook and dialing of a telephone number has been completed.

14. The telephone apparatus according to claim 12, wherein the determining means determines whether the telephone apparatus is connected to another telephone apparatus by determining one of whether a speaker function has been operated and the telephone apparatus has received a call, and whether the speaker function has been operated and dialing of a telephone number has been completed.

15. The telephone apparatus according to claim 10, wherein the predetermined operating means is a means for performing an abbreviated dialing function.

16. The telephone apparatus according to claim 15, further comprising:
    storage means for storing a telephone number; and
    memory calling means for reading the telephone number from the storage unit and calling the telephone number,
    wherein the predetermined operating means instructs the memory calling means to make a call.

17. The telephone apparatus according to claim 10, wherein the predetermined operating means is a means for performing a redial function.

18. The telephone apparatus according to claim 17, further comprising:
    storage means for storing a telephone number previously dialed; and
    memory calling means for reading the telephone number from the storage means and calling the telephone number.

19. A method for operating a telephone apparatus for use by a first party, comprising:
    switching the first party's telephone connection between a second party's telephone and a third party's telephone, when the third party attempts to call the first party while the first party is connected to the second party in a call;
    instructing the switching of the first party's telephone connection between the second party's telephone and the third party's telephone; and
    instructing the performance of a function different than the switching step only when the telephone apparatus is not connected to another telephone apparatus.

20. The method for operating a telephone apparatus for use by a first party of claim 19, further comprising:

determining whether the telephone apparatus is connected to another telephone apparatus;

causing a call-waiting operating portion to function as a predetermined operating portion that has a function other than a function of the call-waiting operating portion, when the determining step determines that the telephone apparatus is not connected to another telephone apparatus, and for causing the call-waiting operating portion to operate as the call-waiting operating portion when the determining portion determines that the telephone apparatus is connected to another telephone apparatus.

21. A telephone apparatus for use by a first party, comprising:

a call-waiting unit that switches the first party's telephone connection between a second party's telephone and a third party's telephone, when the third party attempts to call the first party while the first party is connected to the second party in a call; and a call-waiting operating portion that instructs the call waiting unit to switch the first party's telephone connection between the second party's telephone and third party's telephone, the call-waiting operating portion also operating as a predetermined operating portion having a function different than the call-waiting operating portion, wherein the predetermined operating portion is a portion for performing an abbreviated dialing function.

22. The telephone apparatus according to claim 21, further comprising:

a storage unit that stores a telephone number; and a memory calling unit that reads the telephone number from the storage unit and calls the number, wherein the predetermined operating portion instructs the memory calling unit to make a call.

23. A telephone apparatus for use by a first party, comprising:

a call-waiting unit that switches the first party's telephone connection between a second party's telephone and a third party's telephone, when the third party attempts to call the first party while the first party is connected to the second party in a call; and a call-waiting operating portion that instructs the call-waiting unit to switch the first party's telephone connection between the second party's telephone and the third party's telephone, the call-waiting operating portion also operating as a predetermined operating portion having a function different than the call-waiting operating portion, wherein the predetermined operating portion is a portion for performing a redial function.

24. The telephone apparatus according to claim 23, further comprising:

a storage unit that stores a telephone number previously dialed; and a memory calling unit that reads the telephone number from the storage unit and calls the telephone number, wherein the predetermined operating portion instructs the memory calling unit to make a call.

25. A telephone apparatus for use by a first party, comprising:

call-waiting means for switching the first party's telephone connection between a second party's telephone and a third party's telephone, when the third party attempts to call the first party while the first party is connected to the second party in a call; and call-waiting operating means for instructing the call-waiting means to switch the first party's telephone connection between the second party's telephone and the third party's telephone, the call-waiting operating means also operating as a predetermined operating means having a function different than the call-waiting operating means, wherein the predetermined operating means is a means for performing an abbreviated dialing function.

26. The telephone apparatus according to claim 25, further comprising:

storage means for storing a telephone number: and memory calling means for reading the telephone number from the storage unit and calling the telephone number, wherein the predetermined operating means instructs the memory calling means to make a call.

27. A telephone apparatus for use by a first party, comprising:

call-waiting means for switching the first party's telephone connection between a second party's telephone and a third party's telephone, when the third party attempts to call the first party while the first party is connected to the second party in a call; and call-waiting operating means for instructing the call-waiting means to switch the first party's telephone connection between the second party's telephone and the third party's telephone, the call-waiting operating means also operating as a predetermined operating means having a function different than the call-waiting operating means, wherein the predetermined operating means is a means for performing a redial function.

28. The telephone apparatus according to claim 27, further comprising:

storage means for storing a telephone number previously dialed: and memory calling means for reading the telephone number from the storage means and calling the telephone number.

* * * * *